US012033784B2

(12) United States Patent
Ryu et al.

(10) Patent No.: US 12,033,784 B2
(45) Date of Patent: Jul. 9, 2024

(54) COIL COMPONENT

(71) Applicant: SAMSUNG ELECTRO-MECHANICS CO., LTD., Suwon-si (KR)

(72) Inventors: Joung Gul Ryu, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 714 days.

(21) Appl. No.: 16/990,252

(22) Filed: Aug. 11, 2020

(65) Prior Publication Data

US 2021/0350971 A1 Nov. 11, 2021

(30) Foreign Application Priority Data

May 6, 2020 (KR) ........................ 10-2020-0053741

(51) Int. Cl.
*H01F 27/28* (2006.01)
*H01F 27/30* (2006.01)
*H01F 41/04* (2006.01)

(52) U.S. Cl.
CPC ......... *H01F 27/2804* (2013.01); *H01F 27/30* (2013.01); *H01F 41/041* (2013.01); *H01F 2027/2809* (2013.01)

(58) Field of Classification Search
CPC ............................. H01F 27/2804; H01F 27/30
(Continued)

(56) References Cited

U.S. PATENT DOCUMENTS 7,206,187 B2 * 4/2007 Satou ..................... H01G 4/232 361/309
8,455,769 B2 * 6/2013 Matsushita .............. H05K 3/38 361/306.1
(Continued)

FOREIGN PATENT DOCUMENTS

CN 104575946 A 4/2015
CN 109003778 A * 12/2018 ......... H01F 17/0006
(Continued)

OTHER PUBLICATIONS

Office Action dated Nov. 14, 2023 issued in the corresponding Chinese Patent Application No. 202011107472.9.

*Primary Examiner* — Shawki S Ismail
*Assistant Examiner* — Joselito S. Baisa
(74) *Attorney, Agent, or Firm* — Morgan, Lewis & Bockius LLP

(57) ABSTRACT

A coil component includes a support substrate, a coil portion disposed on the support substrate, and a body in which the support substrate and the coil portion are disposed. The coil portion includes a coil pattern portion, a lower pattern portion connected to the coil pattern portion and disposed on one surface of the support substrate, a dummy pattern portion disposed to overlap the lower pattern portion on another surface of the support substrate opposite to the one surface, and a through-via penetrating through the support substrate and connecting the lower pattern portion and the dummy pattern portion to each other. The lower pattern portion and the dummy pattern portion are externally exposed through one surface of the body. The through-via has one surface externally exposed through the one surface of the body.

14 Claims, 8 Drawing Sheets

(58) Field of Classification Search
USPC ........................................................... 36/200
See application file for complete search history.

(56) References Cited

U.S. PATENT DOCUMENTS

| | | | | |
|---|---|---|---|---|
| 9,490,062 | B2 * | 11/2016 | Yoon | H01F 17/0013 |
| 11,094,447 | B2 * | 8/2021 | Shimoichi | H01F 41/10 |
| 11,574,768 | B2 * | 2/2023 | Lee | H01F 17/04 |
| 11,756,724 | B2 * | 9/2023 | Yoon | H01F 17/0013 336/192 |
| 2007/0267718 | A1 * | 11/2007 | Lee | H01L 23/5227 257/531 |
| 2015/0048915 | A1 * | 2/2015 | Yoon | H01F 17/0013 336/192 |
| 2015/0102891 | A1 * | 4/2015 | Yoon | H01F 27/2804 336/200 |
| 2018/0122555 | A1 | 5/2018 | Kim et al. | |
| 2018/0286561 | A1 | 10/2018 | Shimoichi | |
| 2020/0365312 | A1 * | 11/2020 | Kim | H01F 27/29 |
| 2020/0402704 | A1 * | 12/2020 | Kim | H01F 27/327 |
| 2022/0013271 | A1 * | 1/2022 | Kim | H01F 17/04 |
| 2022/0102061 | A1 * | 3/2022 | Park | H01F 27/323 |
| 2022/0122760 | A1 * | 4/2022 | Jung | H01F 17/0013 |
| 2022/0399161 | A1 * | 12/2022 | Yang | H01F 27/2804 |

FOREIGN PATENT DOCUMENTS

| | | | | |
|---|---|---|---|---|
| JP | 2018-174306 | A | | 11/2018 |
| KR | 10-2018-0046278 | A | | 5/2018 |
| KR | 20200120375 | A | * | 4/2019 |
| KR | 10-2176278 | B1 | | 11/2020 |
| KR | 10-2191248 | B1 | | 12/2020 |

* cited by examiner

II-II'

S

III-III'

COIL COMPONENT

CROSS-REFERENCE TO RELATED APPLICATION(S)

This application claims the benefit under 35 USC 119(a) of Korean Patent Application No. 10-2020-0053741 filed on May 6, 2020 in the Korean Intellectual Property Office, the entire disclosure of which is incorporated herein by reference for all purposes.

BACKGROUND

1. Field

The present disclosure relates to a coil component.

2. Description of Related Art

An inductor, a coil component, is a typical passive electronic component used in electronic devices, along with a resistor and a capacitor.

As electronic devices are under development to provide higher performance and to be smaller, coil components used in such electronic devices may be increased in number and decreased in size. Accordingly, there have been continuous developments in a thin-film inductor in which a coil portion is formed on a substrate by plating, a coil formed on the substrate is embedded with a magnetic material sheet, and an external electrode is formed on an external surface of a magnetic body.

Due to the trend for the miniaturization of components, an area in which a coil portion is formed may be reduced, even in a thin-film inductor. As a result, it may be difficult to secure high inductance, and a line width of the coil portion may be reduced, thereby increasing resistance.

Therefore, even in the thin-film inductor, the coil portion may be formed to occupy an area as large as possible.

When such a thin-film inductor is manufactured, an end portion of a support substrate is exposed to an external surface of a body, together with an end portion of a coil portion. Since it may be difficult to form a plating layer on a substrate, there is a possibility that poor plating may occur, even in a plating process for the formation of an external electrode.

In addition, when such a thin-film inductor is manufactured, internal coil portions are integrally formed by a plating process. In this case, there is a possibility that plating deviations may occur between the internal coil portions.

SUMMARY

An aspect of the present disclosure is to provide a coil component capable of implementing high inductance by increasing an area in which a coil portion is formed within a size of an existing coil component.

Another aspect of the present disclosure is to provide a coil component capable of preventing poor plating from occurring in a plating process for formation of an external electrode.

Another aspect of the present disclosure is to provide a coil component capable of reducing plating deviations occurring between internal coil portions.

According to an aspect of the present disclosure, a coil component includes a support substrate, a coil portion disposed on the support substrate, and a body in which the support substrate and the coil portion are disposed, having one surface and another surface opposing each other, and a plurality of side surfaces connecting the one surface and the other surface to each other. The coil portion includes a coil pattern portion disposed on a first surface of the support substrate, a lower pattern portion connected to the coil pattern portion and disposed on a first surface of the support substrate, a dummy pattern portion disposed on a second surface of the support substrate opposite to the first surface to overlap the lower pattern portion through the support substrate. The coil portion further includes a through-via penetrating through the support substrate and connecting the lower pattern portion and the dummy pattern portion to each other. The lower pattern portion and the dummy pattern portion are externally exposed through one surface of the body. The through-via has one surface externally exposed through the one surface of the body.

According to an aspect of the present disclosure, a coil component includes a body, a support substrate embedded in the body, and a coil portion disposed on the support substrate and embedded in the body. The coil portion includes a coil and first and second leads extending from respective ends of the coil to a same surface of the body. Each of the first and second leads includes a lower pattern portion and a dummy pattern portion disposed on opposing surfaces of the support substrate and each exposed through the same surface of the body, and includes a through-via extending from the lower pattern portion to the dummy pattern portion and exposed through the same surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
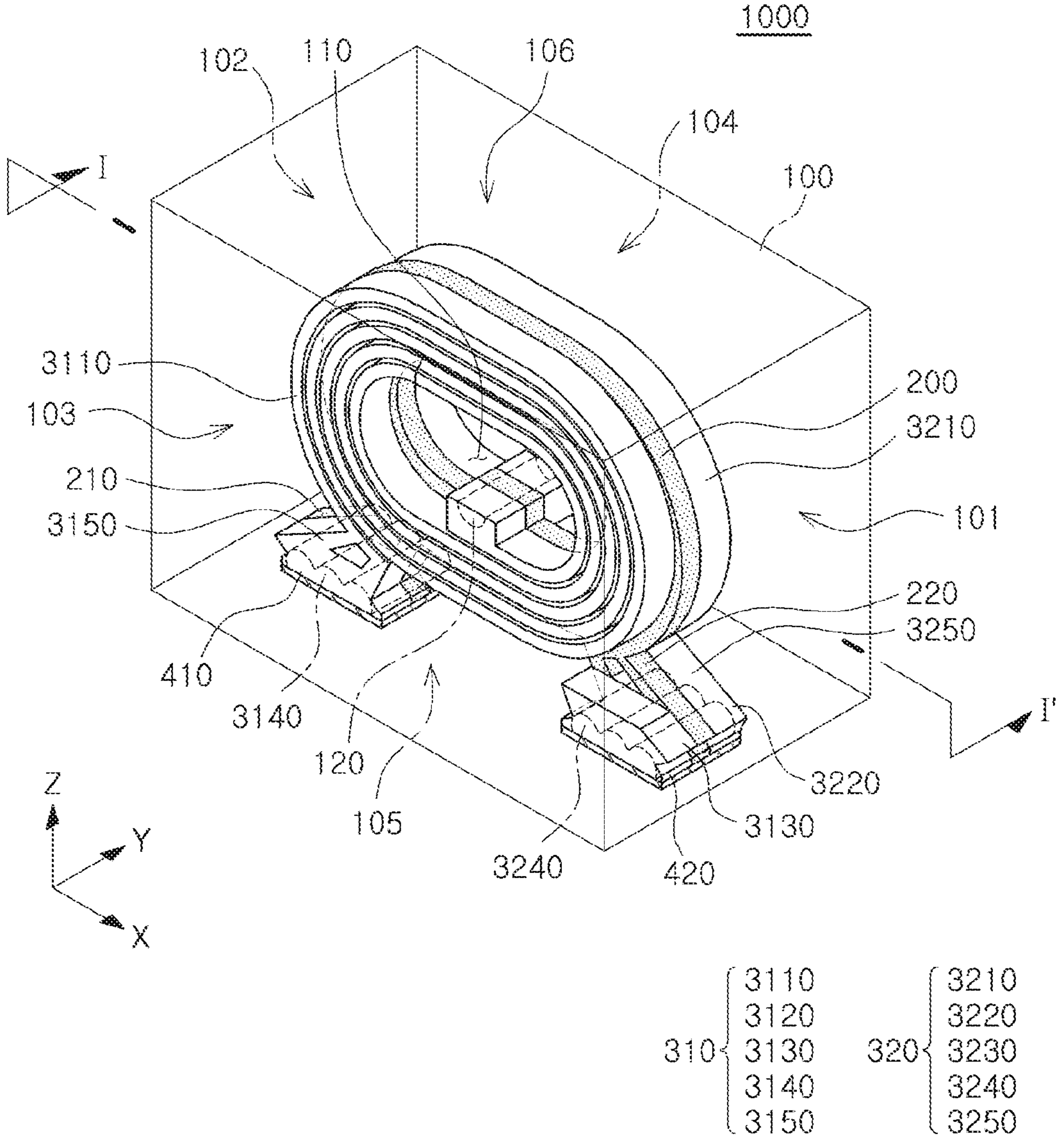
FIG. 1 is a schematic diagram of a coil component according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's positional relationship to another element in the orientation illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to variability in manufacturing techniques and/or tolerances, variations of the shapes illustrated in the drawings may occur. Thus, the scope of the disclosure is not limited to the specific shapes illustrated in the drawings, but includes changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative size, proportions, and depiction of elements in the drawings may be exaggerated for clarity, illustration, and convenience.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, but not limited to, "roughness," "density," "weight," "weight ratio," and/or "molar ratio" may be obtained by the method (s) and/or the tool(s) described in the present disclosure. The present disclosure, however, is not limited thereto. Other methods and/or tools appreciated by one of ordinary skill in the art, even if not described in the present disclosure, may also be used to measure such parameters.

In the drawings, the X direction may be defined as a first direction or a longitudinal direction, a Y direction as a second direction or a width direction, and a Z direction as a third direction or a thickness direction.

Hereinafter, a coil component according to an exemplary embodiment will be described in detail with reference to the accompanying drawings, and in describing with reference to the accompanying drawings, the same or corresponding components are assigned the same reference numbers, and overlapped descriptions thereof will be omitted.

Various types of electronic components are used in electronic devices, and various types of coil components may be appropriately used to remove noise between the electronic components.

For example, in electronic devices, coil components may be used as power inductors, high-frequency (HF) inductors, general beads, high-frequency beads (GHz Beads), and common mode filters.

First Embodiment

Figure 2:
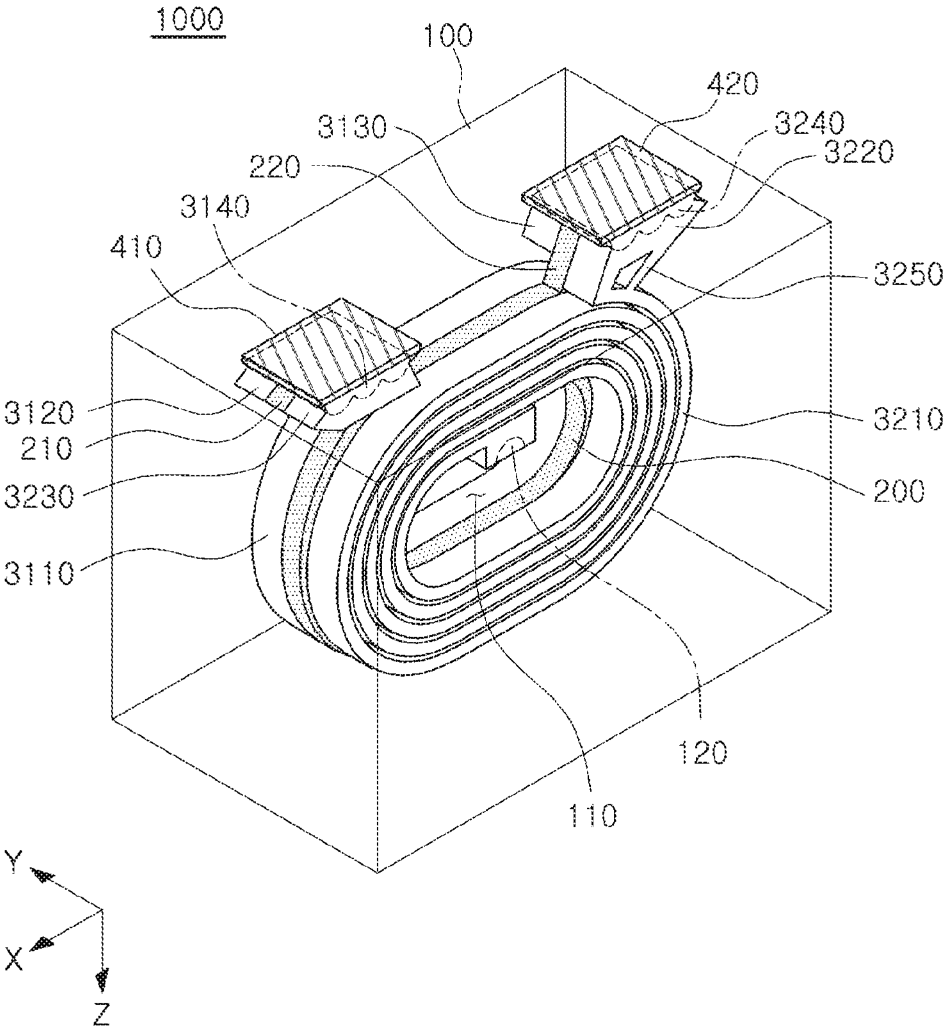
FIG. 2 is a view of the coil component in FIG. 1 when viewed from below.
Figure 3:
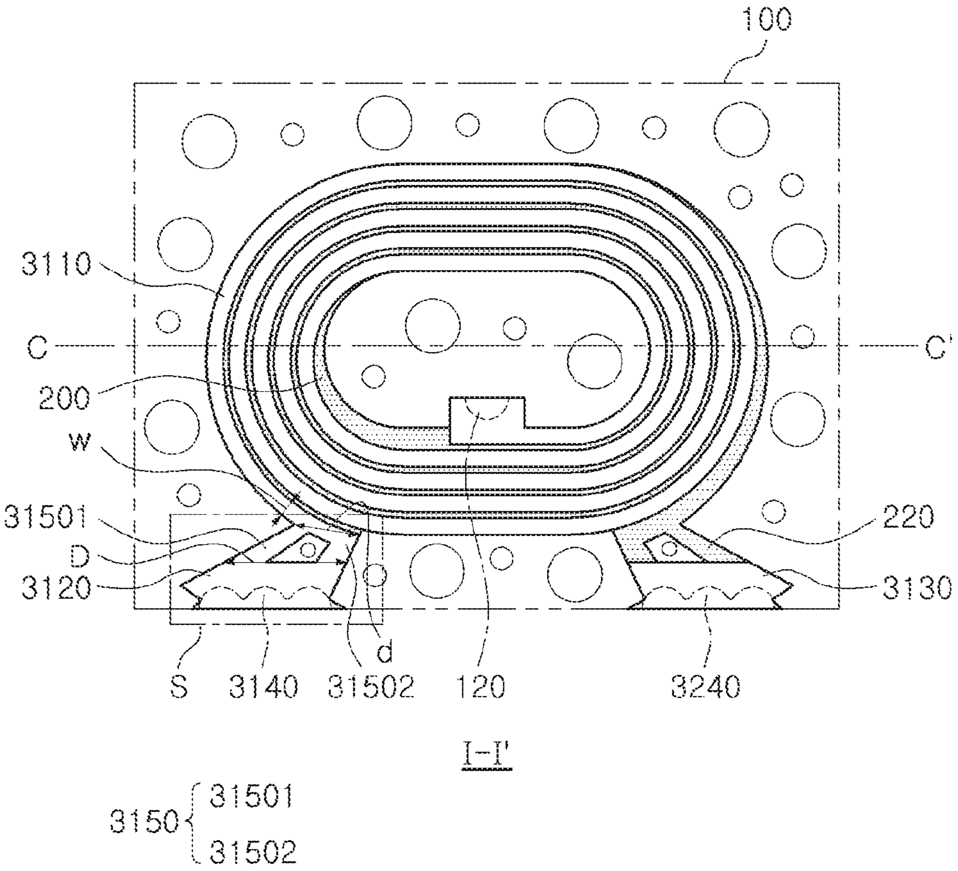
FIG. 3 is a cross-sectional view, illustrating a body of the coil component in FIG. 1, taken along line I-I' in FIG. 1.
Figure 4:
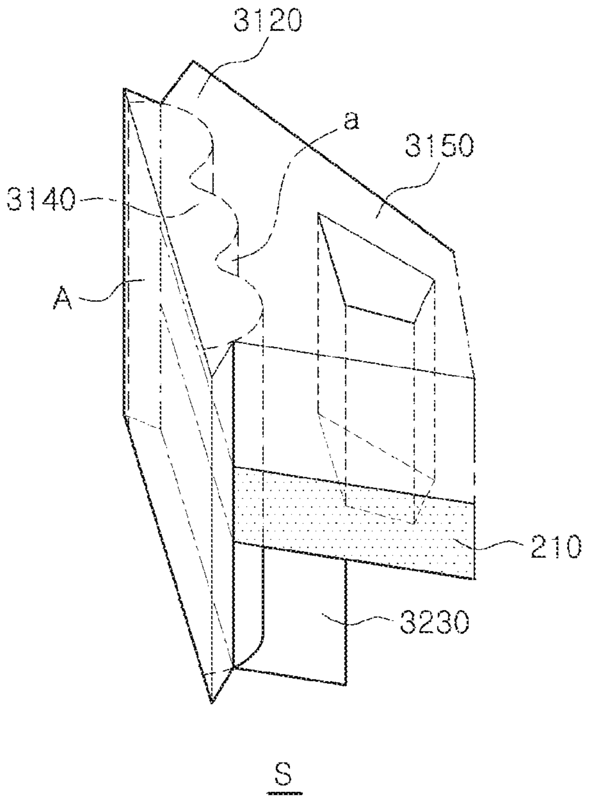
FIG. 4 is an enlarged view of portion S in FIG. 3 when viewed from a side portion.

FIG. 1 is a schematic diagram of a coil component according to a first embodiment of the present disclosure. FIG. 2 is a view of the coil component in FIG. 1 when viewed from below. FIG. 3 is a cross-sectional view, illustrating a body of the coil component in FIG. 1, taken along line I-I' in FIG. 1. FIG. 4 is an enlarged view of portion S in FIG. 3 when viewed from a side portion.

Referring to FIGS. 1 and 2, a coil component 1000 according to the first embodiment may include a body 100, a support substrate 200, and coil portions 310 and 320 and may further include external electrodes 410 and 420.

The support substrate 200 is disposed inside of the body 100 to be described later, has one surface and another surface opposing each other, and supports the first and second coil portions 310 and 320.

The support substrate 200 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with such an insulating resin. For example, the support substrate 200 may be formed of an insulating material such as prepreg, Ajinomoto Build-up Film (ABF), FR-4, a bismaleimide triazine (BT) film, a photoimageable dielectric (PID) film, and the like, but the present disclosure is not limited thereto.

The inorganic filler may be at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide better rigidity. When the support substrate 200 is formed of an insulating material not including glass fibers, the support substrate 200 may be advantageous for thinning the overall coil portions 310 and 320.

A through-hole, not illustrated, is formed through a central portion of the support substrate 200, and the through-hole may be filled with a magnetic material of the body 100 to be described later to form a core portion 110. As described above, the core portion 110 filled with the magnetic material may be formed to improve performance of an inductor.

The first and second support portions 210 and 220 are one region of the support substrate 200 disposed between the first and second coil portions 310 and 320 to be described later and supporting the first and second coil portions 310 and 320.

Referring to FIGS. 1 and 2, the support substrate 200 includes a first support portion 210, supporting a first lower pattern portion 3120 and a second dummy pattern portion 3230 to be described later, and a support portion 220 supporting a second lower pattern portion 3220 and a first dummy pattern portion 3130. The support substrate 200 is not exposed to a fifth surface 105 of the body 100. For example, as will be described later, since through-vias 3140 and 3240 are in contact with the fifth surface 105 of the body 100, the coil portions 310 and 320 are exposed to the fifth surface 105 of the body 100.

The first and second coil portions 310 and 320 are disposed on at least one surface of the support substrate 200 and express characteristics of the coil component 1000. For example, when the coil component 1000 according to this embodiment is used as a power inductor, the first and second coil portions 310 and 320 may store an electric energy as a magnetic field to maintain an output voltage, and thus, may stabilize power of an electronic device.

Referring to FIGS. 1 and 2, the first and second coil portions 310 and 320 are respectively disposed on one surface and another surface of the support substrate 200 opposing each other. The first coil portion 310 is disposed on one surface of the support substrate 200 to oppose the second coil portion 320 disposed on the other surface of the support substrate 200. The first and second coil portions 310 and 320 may be electrically connected to each other through a via electrode 120 penetrating through the support substrate 200. Each of the first coil portion 310 and the second coil portion 320 may have a planar spiral shape in which at least one turn is formed around the core portion 110. As an example, the first coil portion 310 may form at least one turn about an axis of the core portion 110 on the one surface of the support substrate 200.

According to an embodiment, the first and second coil portions 310 and 320 may be formed to be upright with respect to the fifth surface 105 or the sixth surface 106 of the body 100. For example, each of the first and second coil portions 310 and 320 may have a plurality of turns disposed on a same surface that is orthogonal to the fifth and sixth surfaces 105 and 106.

As illustrated in FIG. 1, the sentence "the first and second coil portions are formed to be upright with respect to the fifth surface 105 or the sixth surface 106 of the body 100" means that the first and second coil portions 310 and 320 are formed such that contact surfaces between the first and second coil portions 310 and 320 and the support substrate 200 are perpendicular or substantially perpendicular to the fifth surface 105 or the sixth surface 106 of the body 100. For example, the first and second coil portions 310 and 320 and the fifth surface 105 or the sixth surface 106 of the body 100 may be formed to be upright at an angle of 80 to 100 degrees relative to each other.

The first and second coil portions 310 and 320 may be formed to be parallel to the third surface 103 and the fourth surface 104 of the body 100. For example, contact surfaces between the first and second coil portions 310 and 320 and the support substrate 200 may be parallel to the third surface 103 and the fourth surface 104 of the body 100.

As a size of the coil component 1000 is reduced to 1608 or 1006 or less, the body 100 having a thickness greater than a width is formed. Therefore, a cross section of the body 100 in an X-Z direction has a larger cross-sectional area than a cross section of the body 100 in an X-Y direction. In addition, as the first and second coil portions 310 and 320 are formed to be upright with respect to the fifth surface 105 or the sixth surface 106 of the body 100, an area in which the first and second coil portions 310 and 320 may be formed is increased. The larger the area in which the first and second coil portions 310 and 320 are formed, the higher the inductance L and the quality factor Q can be achieved.

In this embodiment, the first and second coil portions 310 and 320 include first and second coil pattern portions 3110 and 3210 each forming a plurality of turns. Referring to FIG. 3, the first coil portion 310 has a constant line width w through the first coil pattern portion 3110. The first coil pattern portion 3110 is disposed (or extends) on a lower side of the body 100 based on a center of the body 100 in a thickness direction Z. For example, since each of the first coil pattern portions 3110 is disposed (or extends) below the center line C-C' passing through a central portion of the body 100 in the thickness direction Z, the number of turns of the first coil portion 310 is increased, as compared with a case in which the first coil pattern portion 3110 is disposed on the center line C-C'. Although not illustrated in detail, the second coil portion 320 has a constant line width w through the second coil pattern portion 3210. The second coil pattern portion 3210 is disposed (or extends) on a lower side of the body 100 based on the center C-C' of the body 100 in the thickness direction Z. For example, since each of the second coil pattern portions 3210 is disposed (or extends) below the center line C-C' passing through the center of the body 100 in the thickness direction Z, the number of turns of the second coil portion 320 is increased, as compared with a case in which the second coil pattern portion 3210 is disposed on the center line C-C'.

The body 100 may form an exterior of the coil component 1000 according to this embodiment, and may embed the first and second coil portions 310 and 320 therein.

The body 100 may be formed to have a hexahedral shape overall.

Based on FIG. 1, the body 100 may have a first surface 101 and a second surface 102 opposing each other in a length direction X, a third surface 103 and a fourth surface 104 opposing each other in a width direction Y, and a fifth surface 105 and a sixth surface 106 opposing each other in a thickness direction Z. The body 100 has one surface and the other surface, opposing each other, and a plurality of side surfaces connecting the one surface and the other surface to each other. Hereinafter, the plurality of side surfaces of the body 100 may refer to a first surface 101, a second surface 102, a third surface 103, and a fourth surface 104 of the body 100. In addition, the one surface and the other surface of the body 100 may refer to the fifth surface 105 and the sixth surface 106, respectively.

As an example, the body 100 may be formed such that the coil component 1000 of this embodiment, in which first and second external electrodes 410 and 420 to be described later are formed, has a length (e.g., in the X direction) of 1.0 mm, a width (e.g., in the Y direction) of 0.6 mm, a thickness (e.g., in the Z direction) of 0.8 mm or less or a length of 0.8 mm, a width of 0.4 mm, and a thickness of 0.8 mm or less, but the present disclosure is not limited thereto. Since the above-mentioned values are merely design values which do not reflect a process error or the like, deviations from the cited ranges that are recognizable as within a process error range should be considered to be within the range of the present disclosure. Further, the disclosure is not limited to the particular dimensions cited herein, and coil components having dimensions different from those cited here may fall within the scope of the disclosure.

The body 100 may include a magnetic material and an insulating resin. Specifically, the body 100 may be formed by laminating at least one magnetic composite sheet including an insulating resin and a magnetic material dispersed in the resin. However, the body 100 may have a structure other than the structure in which the magnetic material may be dispersed in the resin. For example, the body 100 may be formed of a magnetic material such as ferrite.

The magnetic material may be, for example, a ferrite powder particle or a magnetic metal powder particle. Examples of the ferrite powder particle may include at least one or more of spinel type ferrites such as Mg-Zn-based ferrite, Mn-Zn-based ferrite, Mn-Mg-based ferrite, Cu-Zn-based ferrite, Mg-Mn-Sr-based ferrite, Ni-Zn-based ferrite, and the like, hexagonal ferrites such as Ba-Zn-based ferrite, Ba-Mg-based ferrite, Ba-Ni-based ferrite, Ba-Co-based ferrite, Ba-Ni-Co-based ferrite, and the like, garnet type ferrites such as Y-based ferrite, and the like, and Li-based ferrites. In addition, the magnetic metal powder particle, included in the body 100, may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder. In this case, the metallic magnetic material may be amorphous or crystalline. For example, the magnetic metal powder particle may be a Fe—Si—B—Cr-based amorphous alloy powder, but the present disclosure is not limited thereto. Each of the ferrite powder and the magnetic metal powder particle may have an average diameter of about 0.1 μm to 30 μm, but the present disclosure is not limited thereto.

The body 100 may include two or more types of magnetic materials dispersed in an insulating resin. In this case, the term "different types of magnetic material" refers to the magnetic materials dispersed in the insulating resin being distinguished from each other by one of an average diameter, a composition, crystallinity, and a shape. The insulating resin may include an epoxy, a polyimide, a liquid crystal polymer, or the like, in a single form or in combined form, but the preset disclosure is not limited thereto.

The first and second coil portions 310 and 320 include first and second lower pattern portions 3120 and 3220, connected to the first and second coil pattern portions 3110 and 3210 and disposed on at least one surface of the support substrate 200, to have a line width increased to be greater than the line width w of the first and second coil patterns 3110 and 3210.

Referring to FIGS. 1 and 2, the first lower pattern portion 3120 is connected to the first coil pattern portion 3110 and disposed on one surface of the support substrate 200 to have a line width increased to be greater than the line width w of the first coil pattern portion 3110. The second lower pattern portion 3220 is connected to the second coil pattern portion 3210 and disposed on the other surface of the support substrate 200 to have a line width increased to be greater than the line width w of the second coil pattern portion 3210.

The first and second lower pattern portions 3120 and 3220 are disposed on a side of the fifth surface 105 of the body 100.

Referring to FIGS. 1 and 2, the first and second coil portions 310 and 320 and the first and second external electrodes 410 and 420 to be described later are respectively connected to each other through the first and second lower pattern portions 3120 and 3220 disposed in the body 100. For example, the first and second lower pattern portions 3120 and 3220 may be electrically connected to the first and second-through vias 3140 and 3240 to be described later, functioning as input terminals or output terminals of the coil component 1000.

The first and second coil portions 310 and 320 include dummy pattern portions 3130 and 3230 disposed to face the lower pattern portions 3220 and 3120, respectively, on opposite sides of the support substrate 200.

Referring to FIGS. 1 and 2, first and second dummy pattern portions 3130 and 3230 are disposed on one surface and the other surface of the support substrate 200 to correspond to the second and first lower pattern portions 3220 and 3120. Specifically, the first lower pattern portion 3120 and the second dummy pattern portion 3230 are respectively disposed on the one surface and the other surface of the support substrate 200 to correspond to (or face) each other, and the second lower pattern portion 3220 and the first dummy pattern portions 3130 are respectively disposed to the other surface and the one surface of the support substrate 200 to correspond to (or face) each other.

The first and second dummy pattern portions 3130 and 3230 are disposed on a side of the fifth surface 105 of the body 100.

Referring to FIGS. 1 and 2, the first coil portion 310 includes a first lower pattern portion 3120 and a first dummy pattern portion 3130 spaced apart from each other on the fifth surface 105 of the body 100, and the second coil portion 320 includes a second lower pattern portion 3220 and a second dummy pattern portion 3230 spaced apart from each other on the fifth surface 105 of the body 100.

The first and second dummy pattern portions 3130 and 3230 are electrically connected to the second and first lower pattern portions 3220 and 3120 by the second and first through-vias 3240 and 3140, respectively, and may be directly connected to the second and first external electrodes 420 and 410. Since the first and second dummy pattern portions 3130 and 3230 are directly connected to the second and first external electrodes 420 and 410, adhesion strength between the first and second external electrodes 410 and 420 and the body 100 may be improved. The body 100 includes an insulating resin and a magnetic metal material, and the first and second external electrodes 410 and 420 include a conductive metal. Since the body 100 and the first and second external electrodes 410 and 420 include different types of materials, they have a strong tendency not to be mixed with each other. Since the connection between the first and second dummy pattern portions 3130 and 3230 and the second and first external electrodes 420 and 410 is metal-to-metal adhesion, it may have higher coupling strength than adhesion between the body 110 and the first and second external electrode 410 and 420.

Therefore, adhesion strength of the external electrodes 410 and 420 to the body 100 may be improved.

The first and second coil portions 310 and 320 include first and second through-vias 3140 and 3240 penetrating through the support substrate 200 and connecting the first and second lower pattern portions 3120 and 3220 and the second and first dummy pattern portions 3230 and 3130 to each other. Specifically, the first through-via 3140 penetrates through the first support portion 210 and connects the first lower pattern portion 3120 and the second dummy pattern portion 3230 to each other, and the second through-via 3240 penetrates through the second support portion 220 and connects the second lower pattern portion 3220 and the first dummy pattern portion 3130 to each other.

Referring to FIGS. 1 and 2, the first and second through-vias 3140 and 3240 are exposed to the fifth surface 105 of the body 100 to cover the support substrate 200 on the fifth surface 105 of the body 100. Specifically, the first through-via 3140 is exposed on the fifth surface 105 of the body 100 to cover the first support 210 on the fifth surface 105 of the body 100, and the second through-via 3240 is exposed to the fifth surface 105 of the body 100 to cover the second support 220 on the fifth surface 105 of the body 100.

Referring to FIGS. 1 and 2, one surface of each of the first and second through-vias 3140 and 3240 is disposed on the same plane as the fifth surface 105 of the body 100. For example, since external surfaces A of the first and second through-vias 3140 and 3240 to be described later are in contact with the fifth surface 105 of the body 100, they are disposed on the same plane as the fifth surface 105 of the body 100. Referring to FIG. 4, the external surface A of the first through-via 3140 is disposed on the same plane as the fifth surface 105 of the body 100 to be in contact with the fifth surface 105 of the body 100. Although not illustrated in detail, the external surface A of the second through-via 3240 is disposed on the same plane as the fifth surface 105 of the body 100 to be in contact with the fifth surface 105 of the body 100.

In a related-art coil component having a lower electrode structure in which external electrodes 410 and 420 are formed on a lower surface of a body 100, an area of lower pattern portions 3120 and 3220 exposed to the lower surface of the body 100 is significantly smaller than an area of the lower surface of the body 100. As a result, adhesion strength between coil portions 310 and 320 is low. Such an issue may become severe in the coil component of the present disclosure in which a line width d of one end of each of the connection portions 3150 and 3250 connected to an end portion of each of the coil pattern portions 3110 and 3210 is smaller than a line width D of the other end of each of the connection portions 3150 and 3250 connected to the lower pattern portions 3120 and 3220. In addition, in the related-art coil component in which a support substrate 200 is exposed to an external surface of the body 100, external electrodes 410 and 420 formed of a metal are mostly plated on surfaces of the lower pattern portions 3120 and 3220 and dummy pattern portions 3130 and 3230 because levels of electrical connectivity between the support substrate 200 and the lower pattern portions 3120 and 3220 are different from each other. As a result, the external electrodes 410 and 420 may be poorly plated on an exposed portion of the support substrate 200, that is, poor plating may occur.

In this embodiment, the through-vias 3140 and 3240 are formed by plating such that the support substrate 200 is not exposed to the external surface (e.g., 105) of the body 100, and the lower pattern portions 3120 and 3220 and the dummy patterns 3130 and 3230 are tightly fixed through the through-via 3140 and 3240. As a result, poor plating of the external electrodes 410 and 420 may be reduced and adhesion strength between the body 100 and the coil portions 310 and 320 may be improved.

Referring to FIG. 4, the first and second through-vias 3140 and 3240 each include an external surface A, exposed to (or through) the fifth surface 105 of the body 100, and an internal surface a opposing the external surface A and being in contact with a respective one of the first and second lower pattern portions 3120 and 3220, a respective one of the first and second support portions 210 and 220, and a respective one of the second and the first dummy pattern portions 3230 and 3130.

Each of the through-vias 3140 and 3240 may be formed to have the same diameter as the via electrode 120. In this embodiment, the through-vias 3140 and 3240 are formed together when the coil portions 310 and 320 are plated, and each through-via 3140 and 3240 may be formed by a plurality of adjacent of overlapping vias. A plating resist, not illustrated, is formed on the support substrate to form the coil portions 310 and 320. The plating resist, corresponding to a region in which the through-vias 3140 and 3240 are to be formed, is processed by a laser, or the like. When each of the through-vias 3140 and 3240 are formed to have substantially the same diameter as the via electrode 120, a process of processing the plating resist, corresponding to the region in which the via electrode 120 is to be formed, may be directly used to improve the mass productivity of components. For example, laser used to process the plating resist may be $CO_2$ laser, YAG laser, UV laser, green laser, or the like. A type of the laser, the intensity of the laser, and the like, may be adjusted to form through-vias 3140 and 3240, each having an appropriate size. After the plating resist is processed, a plating layer is integrally formed by plating and filling the coil pattern portions 3110 and 3210, the lower pattern portions 3120 and 3220, the dummy pattern portions 3130 and 3230, and the through-vias 3140 and 3240 together.

The first and second coil portions 310 and 320 further include a first connection portion 3150, connecting an end portion of the first coil pattern portion 3110 and the first lower pattern portion 3120 to each other, and a second connection portion 3250 connecting an end portion of the pattern portion 3210 and the second lower pattern portion 3220 to each other.

Referring to FIG. 3, the first lower pattern portion 3120 is disposed on a lower side of the body 100 disposed below a center of the body 100 in a thickness (Z) direction, and a line width d of one end of the first connection portion 3150, connected to an end portion of the first coil pattern portion 3110, is smaller than a line width D of the other end of the first connection portion 3150 connected to an end portion of the first lower pattern portion 3120. Although not illustrated in detail, the second lower pattern portion 3220 is disposed on a lower side of the body 100 disposed below a center of the body 100 in a thickness direction Z, and a line width d of one end of the second connection portion 3250, connected to an end portion of the second coil pattern portion 3210, is smaller than a line width D of the other end portion of the second connection portion 3250 connected to an end portion of the second coil pattern portion 3210. As shown in FIG. 3, the line widths d and D may be measured along the X direction.

For example, turns of the first coil portions 310 and 320 may be extended as much as possible by locating each of the end portions of the first and second lower pattern portions 3120 and 3220 below a center-line C-C' of the body 100 and making the line width d of one end of each of the first and second connection portions 3150 and 3250, connected to the end portions 3110 and 3210 of the first and second coil pattern portions, smaller than the line width D of the other end of each of the first and second connection portions 3150 and 3250 connected to the first and second lower pattern portions 3120 and 3220. As a result, since the number of turns of each of the first coil portion 310 and the second coil portion 320 is increased by ¼ turn based on the support substrate 200, an area occupied by the coil portions 310 and 320 in the same component may be increased.

As an example, as illustrated in FIG. 3, the first connection portion 3150 may be formed of a plurality of connection conductors 31501 and 31502 spaced apart from each other, and the body 100 may fill an internal space, in which the connection conductors 31501 and 31502 are spaced apart from each other, to further improve overall coupling force of the body 100 and the first and second coil portions 310 and 320 and to increase a flux area. While the description has been mainly given of the first connection portion 3150 for ease of description, the same description as a plurality of connection conductors spaced apart from each other may also be applied to the second connection portion 3250.

The first coil pattern portion 3110, the first lower pattern portion 3120, the first dummy pattern portion 3130, the first through-via 3140, the first connection portion 3150, and the via electrode 120 may be integrally formed, such that boundaries therebetween may not be formed. However, since this is only an example, a case in which the above-described configurations are formed in different steps to form boundaries therebetween is not excluded from the scope of the present disclosure. In this embodiment, for ease of description, descriptions will be given of the first coil pattern portion 3110 and the first lower pattern portion 3120, but may be equally applied to a second coil pattern portion 3210, a second lower pattern portion 3220, a second dummy pattern portion 3230, a second through-via 3240, and a second connection portion 3250.

At least one of the first coil pattern portion 3110, the first lower pattern portion 3120, the first dummy pattern portion 3130, the first through-via 3140, the first connection portion 3150, and the via electrode 120 may include at least one conductive layer.

As an example, when the first coil pattern portion 3110, the first lower pattern portion 3120, the first dummy pattern portion 3130, the first through-via 3140, the first connection portion 3150, and the via electrode 120 are formed on one surface of the support substrate 200 by plating, each of the first coil pattern portion 3110, the first lower pattern portion 3120, the first dummy pattern portion 3130, and the first through-via 3140, the first connection portion 3150, and the via electrode 120 may include a seed layer and a plating layer. The seed layer may be formed by an electroless plating method or a vapor deposition method such as sputtering or the like. The seed layer is formed overall along a shape of the first coil portion 310. A thickness of the seed layer is not limited, but the seed layer is formed to be thinner than the plating layer. Then, the plating layer may be disposed on the seed layer. As a non-limiting example, the plating layer may be formed using electroplating. Each of the seed layer and the plating layer may have a single-layer structure or a multilayer structure. The plating layer having a multilayer structure may be formed to have a conformal film structure in which one plating layer is covered with another plating layer, or may be formed to have a shape in which one plating layer is laminated on only one surface of another plating layer.

The seed layers of the first coil pattern portion 3110, the first lower pattern portion 3120, the first dummy pattern portion 3130, the first through-via 3140, the first connection portion 3150, and the via electrode 120 may be integrally formed, such that boundaries therebetween may not be formed, but the present disclosure is not limited thereto.

The seed layer and the plating layer of each of the first coil pattern portion 3110, the first lower pattern portion 3120, the first dummy pattern portion 3130, the first through-via 3140, the first connection portion 3150, and the via electrode 120 may be formed of a conductive material such as copper (Cu), aluminum (Al), silver (Ag), tin (Sn), gold (Au), nickel (Ni), lead (Pb), titanium (Ti), molybdenum (Mo), or alloys thereof, but the present disclosure is not limited thereto.

Referring to FIGS. 1 and 2, the first and second external electrodes 410 and 420 are disposed on the fifth surface 105 of the body 100 to be spaced apart from each other and cover the first and second through-vias or through-holes 3140 and 3240, respectively. The first external electrode 410 is in contact with and connected to the first lower pattern portion 3120 and the second dummy pattern portion 3230, and the second external electrode 420 is in contact with and connected to the second lower pattern portion 3220 and the first dummy pattern portion 3130.

The first and second external electrodes 410 and 420 electrically connect the coil component 1000 according to this embodiment to a printed circuit board, or the like, when the coil component 1000 is mounted on the printed circuit board, or the like. As an example, the coil component 1000 according to this embodiment may be mounted such that the fifth surface 105 of the body 100 faces an upper surface of the printed circuit board. In this case, since the first and second external electrodes 410 and 420 are disposed on the fifth surface 105 of the body 100 to be spaced apart from each other, a connection portion of the printed circuit board may be electrically connected thereto.

Each of the first and second external electrodes 410 and 420 may include at least one of a conductive resin layer and an electrolytic plating layer. The conductive resin layer may be formed by printing a conductive paste on a surface of the body 100 and curing the printed conductive paste. The conductive paste may include at least one of conductive metals selected from the group consisting of copper (Cu), nickel (Ni), and silver (Ag) and a thermosetting resin. The electroplating layer may include at least one selected from the group consisting of nickel (Ni), copper (Cu), and tin (Sn). In this embodiment, each of the first and second external electrodes 410 and 420 may include a first layer, not illustrated, formed on the surface of the body 100 to be in direct contact with the first and second lower pattern portions 3120 and 3220 and the first and second dummy pattern portions 3130 and 3230, and a second layer, not illustrated, disposed on the first layer. As an example, the first layer may be a nickel (Ni) plating layer and the second layer may be a tin (Sn) plating layer, but the present disclosure is not limited thereto.

Second Embodiment

Figure 5:
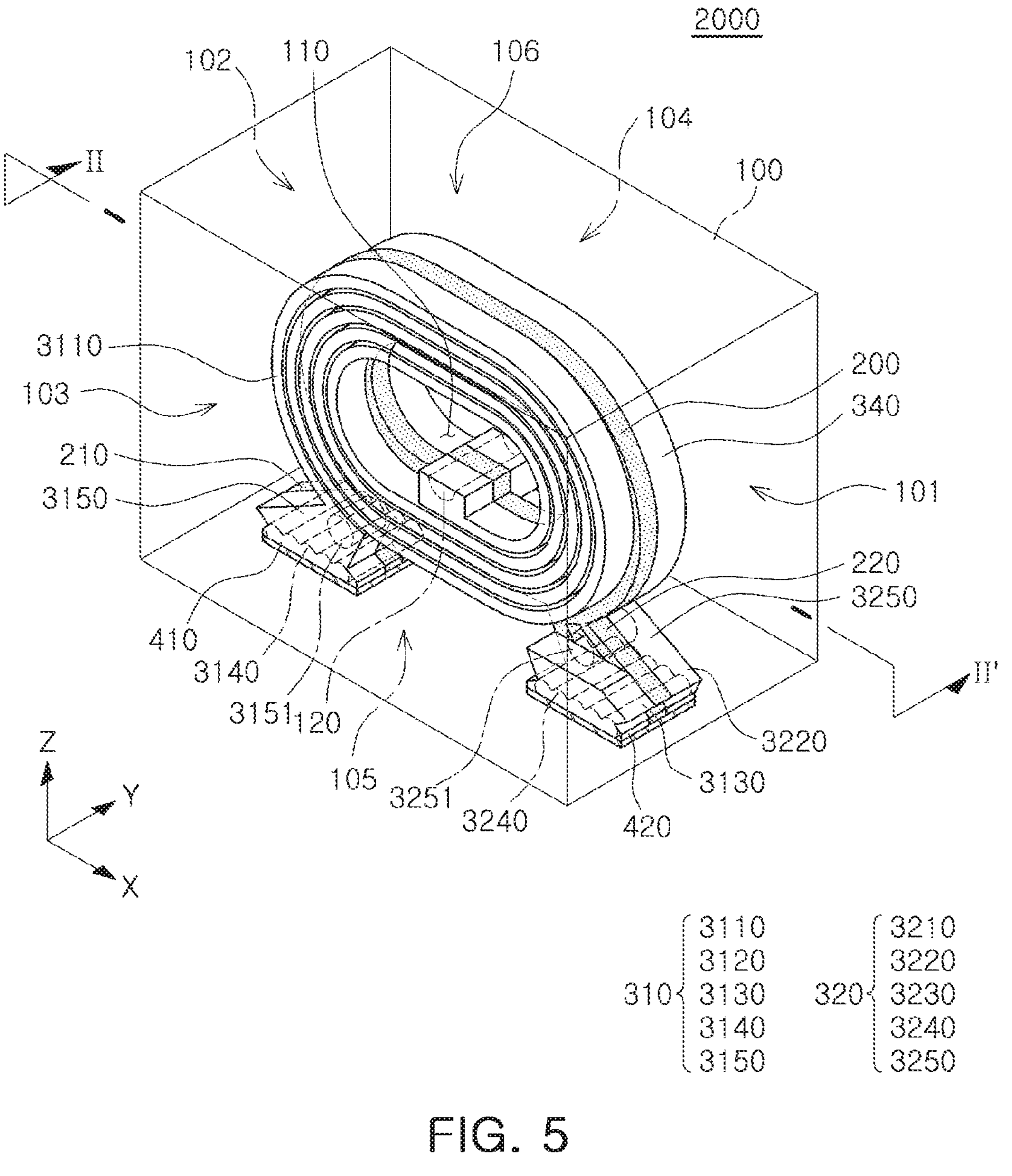
FIG. 5 is a schematic diagram of a coil component according to a second embodiment of the present disclosure.
Figure 6:
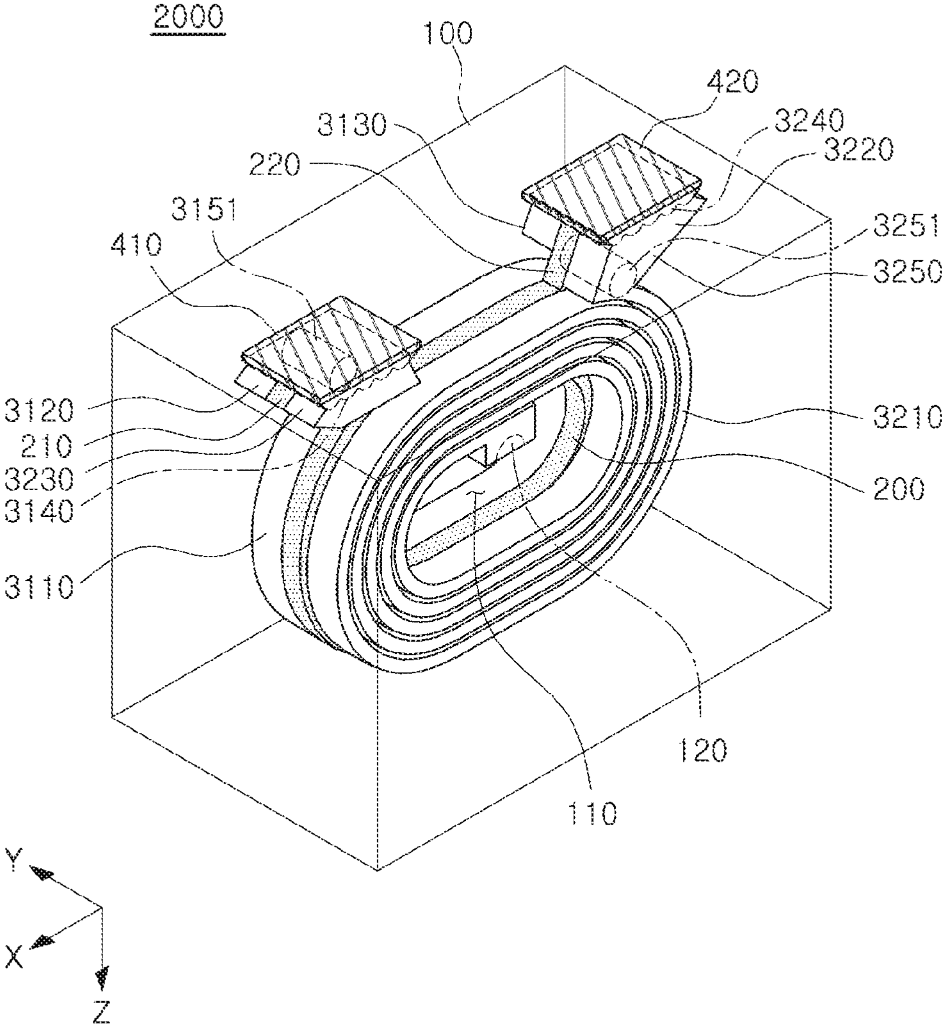
FIG. 6 is a view of the coil component in FIG. 5 when viewed from below.
Figure 7:
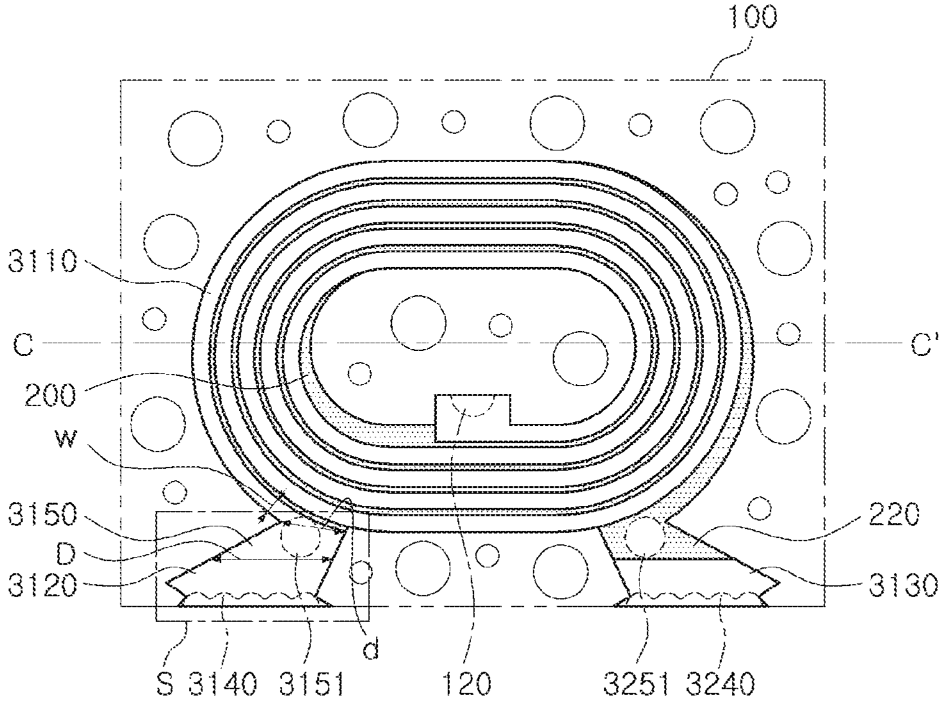
FIG. 7 is a cross-sectional view, illustrating a body of the coil component in FIG. 5, taken along line II-II' in FIG. 5.
Figure 8:
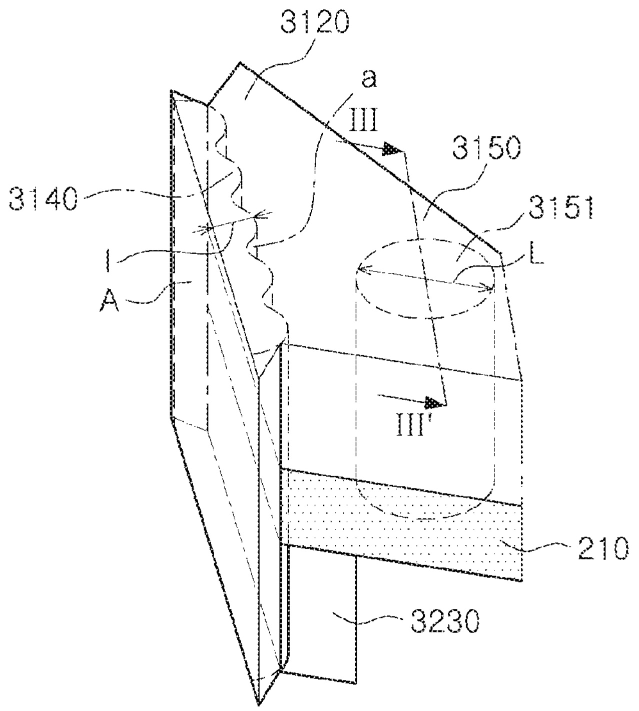
FIG. 8 is an enlarged view of portion S in FIG. 5 when viewed from a side portion.
Figure 9:
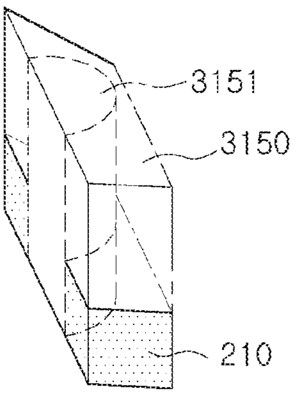
FIG. 9 is a cross-sectional view taken along line III-III' in FIG. 8.

FIG. 5 is a schematic diagram of a coil component according to a second embodiment of the present disclosure. FIG. 6 is a view of the coil component in FIG. 5 when viewed from below. FIG. 7 is a cross-sectional view, illustrating a body of the coil component in FIG. 5, taken along line II-II' in FIG. 5. FIG. 8 is an enlarged view of portion S in FIG. 5 when viewed from a side portion. FIG. 9 is a cross-sectional view taken along line in FIG. 8.

A coil portion 2000 according to this embodiment is different from the coil component 1000 according to the first embodiment, in terms of shapes of first and second connection vias 3151 and 3251 and shapes of first and second through-vias 3140 and 3240. Therefore, a description of this embodiment will be given of only the shapes of the first and second connection vias 3151 and 3251 and the shapes of the first and second through-vias 3140 and 3240 different from those in the first embodiment. The descriptions of the first embodiment will be equally applied to the rest of the configurations according to this embodiment.

Referring to FIGS. 7 and 9, a first connection portion 3150 has a first connection via 3151 penetrating through a first coil pattern portion 3110 and a first support portion 210. Although not illustrated in detail, a second connection portion 3250 has a second connection via 3251 penetrating through a second coil pattern portion 3210 and a second support portion 220. As a result, the coil component of this embodiment may further improve adhesion strength between coil portions 310 and 320 and a body 100, as compared with the coil component 1000 according to the first embodiment in which the first and second connection portions 3150 and 3250 are formed of connection conductors spaced apart from each other.

Referring to FIG. 8, a diameter 1 of a first through-via 3140 is smaller than a diameter L of a first connection via 3151. Although not illustrated in detail, a diameter of a second through-via 3240 is smaller than a diameter of a second connection via 3251. Referring to FIGS. 5 and 6, a diameter of each of the first and second through-vias 3140 and 3240 is smaller than a diameter of a via electrode 120.

As described above, in this embodiment, the coil pattern portions 3110 and 3210, lower pattern portions 3120 and 3220, dummy pattern portions 3130 and 3230, the through-vias 3140 and 3240, and connection portion 3150 and 3250 are simultaneously plated. When a diameter of each of the through-vias 3140 and 3240 is significantly larger than a diameter of the via electrode 120, there is a possibility that a plating deviation occurs between the through-vias 3140 and 3240 and the coil portions 310 and 320 except for the through-vias 3140 and 3240. As a result, a dimple may occur on a fifth surface 105 of the body 100 to which the through-vias 3140 and 3240 are exposed, for example, on an external surface A of each of the through-vias 3140 and 3240. Meanwhile, when the diameter of each of the through-vias 3140, 3240 is smaller than the diameter of the via electrode 120, there is a possibility that over-plating of the fifth surface 105 of the body 100 to which the through-vias 3140 and 3240 are exposed, for example, of the external surface of each of through-vias 3140 and 3240. In this embodiment, sizes of the connection vias 3151 and 3251 and sizes of the through-vias 3140 and 3240 may be appropriately adjusted to improve adhesion strength between the coil portions 310 and 320 and the body 100 and to reduce occurrence of a dimple or over-plating. In particular, in this embodiment, each of the through-vias 3140 and 3240 are formed to have a smaller diameter than each of the connection vias 3151 and 3251 to improve adhesion strength between the coil portions 310 and 320 and the body 100 and to significantly reduce occurrence of a dimple.

As described above, high inductance may be implemented by increasing an area in which a coil portion is formed within a size of the same coil component.

In addition, poor plating may be prevented from occurring in a plating process for formation of an external electrode.

In addition, plating deviation occurring between internal coil portions may be reduced.

While example embodiments have been shown and described above, it will be apparent to those skilled in the art that modifications and variations could be made without departing from the scope of the present disclosure as defined by the appended claims.

What is claimed is:

1. A coil component comprising:
- a support substrate;
- a coil portion disposed on the support substrate;
- a body, in which the support substrate and the coil portion are disposed, having one surface and another surface opposing each other in a direction, and a plurality of side surfaces connecting the one surface and the other surface to each other; and
- external electrodes disposed only on the one surface of the body and spaced apart from the plurality of side surfaces of the body, the external electrodes being separated from the support substrate by through vias disposed between the support substrate and the external electrodes,
- wherein the coil portion comprises a coil pattern portion disposed on a first surface of the support substrate, a lower pattern portion connected to the coil pattern portion and disposed on the first surface of the support substrate, a dummy pattern portion disposed on a second surface of the support substrate opposite to the first surface to overlap the lower pattern portion through the support substrate, and a through-via penetrating through the support substrate and connecting the lower pattern portion and the dummy pattern portion to each other,
- the lower pattern portion and the dummy pattern portion are externally exposed through the one surface of the body,
- the through-via has one surface externally exposed through the one surface of the body, and
- the support substrate is spaced apart from the one surface of the body in the direction.

2. The coil component of claim 1, wherein the one surface of the through-via is disposed on a same plane as the one surface of the body.

3. The coil component of claim 1, wherein the support substrate is not exposed to the one surface of the body.

4. The coil component of claim 1, wherein the coil portion includes first and second coil portions, respectively disposed on the first surface and the second surface of the support substrate, the first coil portion comprises the lower pattern portion and a second dummy pattern portion disposed on the first surface of the support substrate to be spaced apart from each other, the second coil portion comprises a second lower pattern portion and the dummy pattern portion disposed on the second surface of the support substrate to be spaced apart from each other, and the second lower pattern portion and the second dummy pattern portion are disposed to overlap each other on the opposite first and second surfaces of the support substrate.

5. The coil component of claim 4, wherein the support substrate comprises a first support portion, supporting the lower pattern portion and the dummy pattern portion, and a second support portion supporting the second lower pattern portion and the second dummy pattern portion.

6. The coil component of claim 5, wherein the through-via comprises a first through-via, penetrating through the first support portion and connecting the lower pattern portion and the dummy pattern portion to each other, and a second through-via penetrating through the second support portion and connecting the second lower pattern portion and the second dummy pattern portion to each other.

7. The coil component of claim 6, wherein the first through-via is externally exposed through the one surface of the body, and the first support portion is spaced apart from the one surface of the body by the first through-via, and the second through-via is externally exposed through the one surface of the body, and the second support portion is spaced apart from the one surface of the body by the second through-via.

8. The coil component of claim 6, wherein one surface of the first through-via is disposed on a same plane as the one surface of the body, and one surface of the second through-via is disposed on the same plane as the one surface of the body.

9. The coil component of claim 5, wherein the through-via comprises a first through-via having an external surface, exposed through the one surface of the body, and an internal surface opposing the external surface and in contact with the lower pattern portion, the first support portion, and the dummy pattern portion, and a second through-via having an external surface, exposed through the one surface of the body, and an internal surface opposing the external surface and in contact with the second lower pattern portion, the second support portion, and the second dummy pattern portion.

10. The coil component of claim 5, wherein the first and second coil portions further comprise a first connection portion, connecting an end portion of the coil pattern portion and the lower pattern portion to each other, and a second connection portion connecting an end portion of a second coil pattern portion disposed on the second surface of the support substrate and the second lower pattern portion to each other.

11. The coil component of claim 10, wherein the first and second coil pattern portions each have a plurality of coil turns having a constant line width extending to respective end portions thereof, each of the lower pattern portion and the second lower pattern portion extends below a center of the body in a thickness direction, and a line width of one end of each respective one of the first and second connection portions, connected to an end portion of a respective one of the first and second coil patterns, is smaller than a line width of the other end of the respective one of the first and second connection portions connected to an end portion of a respective one of the lower pattern portion and the second lower pattern portion.

12. The coil component of claim 10, wherein the first connection portion has a first connection via penetrating through the coil pattern portion and the first support portion, and the second connection portion has a second connection via penetrating through the second coil pattern portion and the second support portion.

13. The coil portion of claim 12, wherein the through-via has a diameter smaller than diameters of the first and second connection vias.

14. The coil component of claim 1, further comprising: an external electrode covering the through-via.

* * * * *